(12) United States Patent
Schlomka et al.

(10) Patent No.: US 7,263,160 B2
(45) Date of Patent: Aug. 28, 2007

(54) METHOD AND DEVICE FOR EXAMINING AN OBJECT

(75) Inventors: Jens-Peter Schlomka, Hamburg (DE); Jörg Sabczynski, Norderstedt (DE); Jörn Borgert, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/545,063

(22) PCT Filed: Feb. 3, 2004

(86) PCT No.: PCT/IB2004/000362

§ 371 (c)(1),
(2), (4) Date: Aug. 10, 2005

(87) PCT Pub. No.: WO2004/072685

PCT Pub. Date: Aug. 26, 2004

(65) Prior Publication Data

US 2006/0203960 A1    Sep. 14, 2006

(30) Foreign Application Priority Data

Feb. 13, 2003   (EP) ................... 03100330

(51) Int. Cl.
*G01N 23/04* (2006.01)

(52) U.S. Cl. .......................... 378/57; 378/205

(58) Field of Classification Search ................. 378/57, 378/4, 8, 20, 207–209, 205; 198/345.05, 198/397.06
See application file for complete search history.

(56) References Cited

U.S. PATENT DOCUMENTS 5,367,552 A * 11/1994 Peschmann .................. 378/57
5,394,453 A    2/1995 Harding
5,787,145 A    7/1998 Geus

FOREIGN PATENT DOCUMENTS

DE   4406956 A1   9/1995
GB   2359720 A    8/2001

* cited by examiner

*Primary Examiner*—Hoon Song

(57) ABSTRACT

In the field of airport baggage inspection, a multi-level screening procedure is used. When a first level screening system (18) detects a "suspicious region" inside a bag, it is transferred to a next level system (2) where the bag gets rescanned. According to the present invention, a device/method is provided for finding and tracking the suspicious region inside the baggage which allows to reduce the area to be rescanned significantly. For this purpose, the image from the first level system together with the position of the suspicious region within the image is transferred from the first level system to the second level system. On arrival of the bag at the second level (21), a simple X-ray transmission image is measured using an additional source/detector system (6). The two images are then rigidly registered in order to exactly determine the suspicious region in the second level scanner system.

9 Claims, 3 Drawing Sheets

METHOD AND DEVICE FOR EXAMINING AN OBJECT

The present invention relates to a scanner system for scanning an object, a method of examining an object by means of a first scanner stage and a second scanner stage and a computer program for a scanner system.

Over the past several years, X-ray baggage inspection systems have evolved from single X-ray imaging systems that were completely dependent on interaction by an operator to more sophisticated automatic systems that can automatically recognize certain types of material in the baggage or in packages. The more sophisticated inspection systems have employed single energy or dual energy X-ray radiation transmitted through or scattered from the examined baggage. Some systems have used a single view source detector arrangement; others have utilized a dual view or multi-view arrangement. The single or dual view systems usually scan baggage as it moves on a conveyer, using a scan beam or a scanning pencil beam of X-rays in a fixed geometry. The multi-view, computer tomography (CT) type systems usually scan stationary baggage in a fixed geometry of scan angles and process data corresponding to absorption of X-rays to reconstruct selected slices of the baggage. Novel CT-scanners also apply helical scanning mode, thus producing 3D images of the attenuation coefficient of the object.

Generally, the items of luggage pass through two or more stages. The first stage often consists of a transmission X-ray or CT system capable of handling a large number of luggage articles to be checked. Materials contained in the checked baggage are usually identified by their attenuation coefficients: the attenuation coefficients are compared to tables and are classified into hazardous or dangerous materials and harmless materials. However, the results can be ambiguous.

In case a material has been found which is classified as dangerous material, the baggage is passed to a second stage.

U.S. Pat. No. 5,787,145 discloses an apparatus for identifying crystalline and polycrystalline material in an object placed in an examination region. X-rays having a polychromatic energy distribution are passed through a diaphragm to create a central X-ray beam in a fan plane that is projected into the examination region for irradiating a cross-section of the object. The X-rays are diffracted by individual sub-regions of the object along the cross-section in dependence of the presence of crystalline and/or polycrystalline material in the individual sub-regions. Collimators with collimating windows are arranged beyond the examination region with respect to the diaphragm, each collimating window covering a fixed, predetermined sub-region of the examination region and extracting at least one diffracted plane fan beam from the respective individual sub-region of the object. Energy spectra of the diffracted X-ray plane fan beams exiting the respective one of the collimating windows are captured with a detector located behind each of the collimating windows for converting the captured energy spectra into signals usable in a data processing arrangement.

An energy-dispersive scatter-imaging is known for example from U.S. Pat. No. 5,394,453.

It is a disadvantage of such systems that at the second stage the whole baggage has to be rescanned. This takes a long time and reduces the speed and efficiency of the baggage inspection system.

It is an object of the present invention to provide for a more efficient and dependable examination of an object.

The above object is solved by a scanner system for scanning an object, the scanner system comprising a first scanner stage, a second scanner stage at location, a calculation unit connected to the first scanner stage and to the second scanner stage and receiving first scanning results from the first scanner stage, wherein the calculation unit has an interface for receiving position information on a region of interest within the object and for receiving orientation information with respect to a first orientation of the object. The position information and the orientation information was determined by means of a third scanner stage which is located at a distance from the scanner system and which scanned the object having the first orientation. The calculation unit is further dapted to determine a second orientation of the object at the second location on the basis of the first scanning results from the first scanner stage, to determine a difference between the first orientation and the second orientation by using the orientation information and to determine an area to be scanned at the second scanner stage on the basis of the difference and the position information. The area includes the region of interest.

In other words, in this method according to an exemplary embodiment of the present invention, information on a region of interest (ROI) where suspicious material has been identified at a third scanner stage is used in the scanner system according to this exemplary embodiment of the present invention such that only this ROI or the surrounding of the ROI identified at the third scanner stage is scanned in the scanner system to thereby reduce the amount of time necessary to scan the baggage.

In detail, according to this exemplary embodiment of the present invention, information on the position of the ROI identified at the third scanner stage located at a distance from the scanner system and information on an orientation with which the baggage has been scanned at the third scanner stage is transmitted to the scanner system. Then, at the scanner system, the orientation of the baggage at the scanner system is determined by means of the first scanner stage to thereby determine whether the baggage was moved or deformed. Then, from the difference of the orientation at the third scanner stage and the first scanner stage and the position information received from the third scanner stage, the position of the ROI is identified and the subsequent scanning process at the second scanner stage of the scanner system is limited to the ROI or adjacent areas thereof. Thereby, an efficiency of the scanner system can be increased significantly since the time necessary to scan the baggage can be reduced.

According to an exemplary embodiment of the present invention as set forth in claim 2, a deformation of the object is determined on the basis of at least one of the position information, the orientation information and the second orientation. Then, depending on whether the difference and/or the deformation is within allowable limits, either the whole baggage is scanned or the scanning process is limited to an area including the ROI. Advantageously, this allows for a completely automatic system since even if the baggage was completely deformed between the third scanner stage and the scanner system, the scanning process does not have to be aborted, but continues automatically. Also, a very secure system can be provided, ensuring that all baggage is sufficiently examined.

According to another exemplary embodiment of the present invention as set forth in claim 3, a combination of an X-ray transmission scanner at the first scanner stage and a coherent-scatter computed tomographic scanner (CSCT) is used in the scanner system, allowing for a very fast and efficient recognition of the orientation of the baggage by means of a very secure while cost-effective first scanner stage.

According to another exemplary embodiment of the present invention as set forth in claim 4, the inspection system is a baggage or package inspection system used for example at airports, wherein items of baggage or packages are transported from the third scanner stage to the first scanner stage by means of a conveyer belt. This allows for a very fast and efficient scanning of baggage. Also, since most of the known baggage inspection systems operate with a third scanner system and a scanner stage which are connected to each other by means of a conveyor belt, the scanner system according to the present invention can easily be integrated into an already existing baggage scanning system.

According to another exemplary embodiment of the present invention, a method of examining an object by means of a first scanner stage and a second scanner stage is provided which advantageously allows to identify a ROI which was determined at a preceding third scanner stage, at the first and second scanner stages, irrespective of whether the object has changed its orientation or was deformed.

Further exemplary embodiments of the method of examining an object are provided in claims 6 and 7.

According to another exemplary embodiment of the present invention as set forth in claim 8, a method of examining an object is provided which advantageously allows the very efficient combination of three different scanning processes at three different scanner stages to thereby increase the speed of the scanning of the object while also increasing the security of the scanning system, such that for example when this method is employed in a baggage scanning system, hazardous or suspicious material can be determined almost unambiguously.

Another exemplary embodiment of the present invention as set forth in claim 9 provides for a computer program for a scanner system for examining an object. The computer program according to the invention advantageously allows a very efficient scanning of the object and allows to reduce a scanning time at a final scanner stage of a scanner system.

It is the gist of an embodiment of the present invention to find and track the ROI inside the object and to thereby restrict an area which has to be rescanned at the subsequent scanner stage. For that purpose, image information from the preceding scanner system together with the position of the ROI within the image is transferred to the scanner system. On arrival of the object at the scanner system, a simple X-ray transmission image is measured using an additional source/detector system. The two images can then be rigidly registered and a transformation matrix is determined. On the basis of the transformation matrix, the to be scanned region is determined inside the object. Then, only this region, namely the ROI determined at the preceding scanner stage or adjacent areas thereof, is scanned by means of the second scanner stage of the scanner system, i.e. the final scanner stage of the scanner system.

These and other aspects of the present invention will become apparent from and elucidated with reference to the embodiments described hereinafter.

Exemplary embodiments of the invention will be described in the following, with reference to the following drawings.

Figure 1:
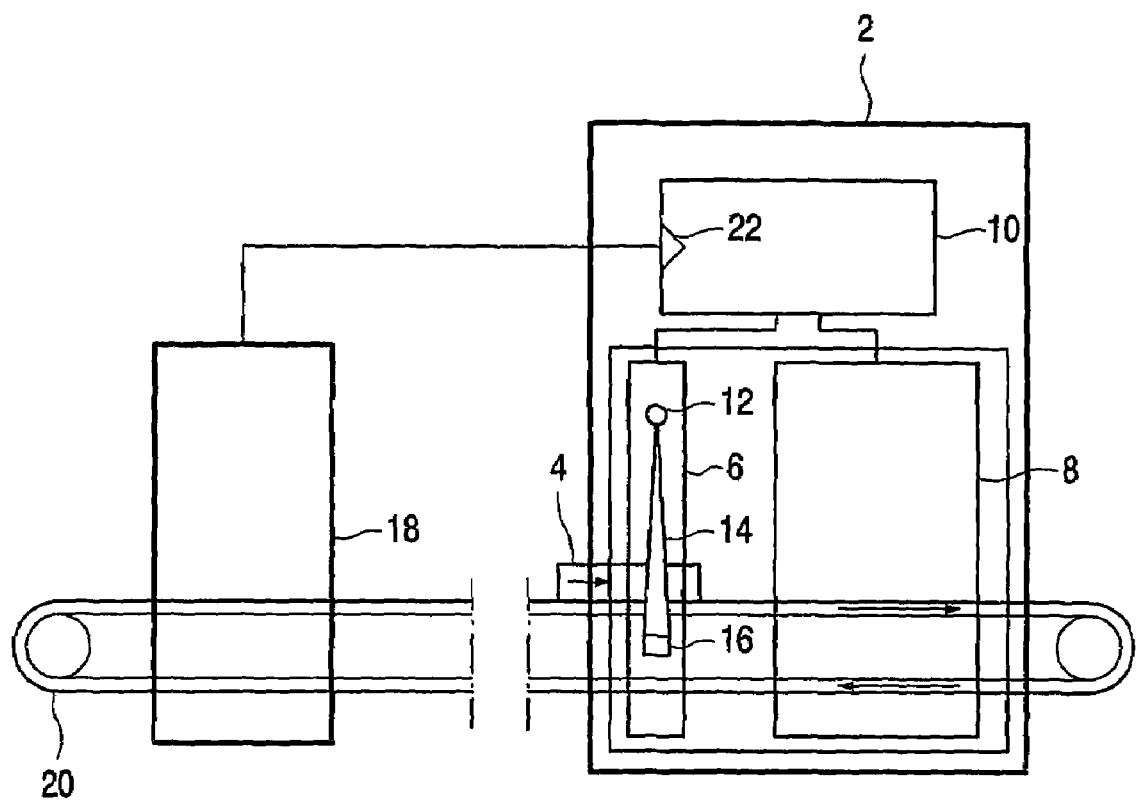
FIG. 1 shows a simplified side view of a scanner system according to an exemplary embodiment of the present invention.

FIG. 1 shows a side view of an exemplary embodiment of a scanner system according to the present invention. In the following, the present invention will be described with reference to a baggage inspection system as it may be used to screen baggage at the airport with respect to hazardous materials, such as explosives. however, it has to be noted that the present invention is not limited to the inspection of baggage. The present invention may also be applied in medical applications or material testing.

The system depicted in FIG. 1 is a multilevel screening system: when a first level screening system detects a suspicious region inside an item of baggage, the item of baggage is transferred to a next level of the system where the bag gets rescanned.

FIG. 1 depicts a scanner system 2 for scanning an object 4 comprising a first scanner stage 6 and a second scanner stage 8. Furthermore, the scanner system 2 comprises a calculation unit 10 connected to the first scanner stage 6 and to the second scanner stage 8. The connection between the first and second stages 6 and 8 and the calculation unit 10 allows that the calculation unit may receive scanning results from the first and second scanner stages 6 and 8.

As depicted in FIG. 1, the first scanner stage 6 comprises an X-ray source 12 emitting an X-ray beam 14 which passes through the item of the baggage 4 and is detected by means of a line detector 16. Such an arrangement is also referred to as X-ray transmission scanner.

The second scanner stage is preferably a CSCT scanner where X-rays are diffracted along a material volume of the item of baggage 4 in dependence of the presence of crystalline and polycrystalline and where the energy spectra of the diffracted X-rays are detected in detectors and are converted to useable signals in the calculation unit in order to determine the kind of materials included in the item of baggage 4.

The calculation unit 10 is further connected to a third scanner stage 18. As may be seen from FIG. 1, the third scanner stage 18 is located at a distance from the scanner system 2. Preferably, the third scanner stage 18 is also connected to scanner system 2 by means of a conveyer belt 20, such that the third scanner stage 18 precedes the scanner system 2 in the direction of transportation of the conveyer belt 20.

Preferably, the third scanner stage comprises either a two-dimensional X-ray scanner or a computer tomographic (CT) scanner.

The third scanner stage 18 is adapted to perform a first level screening step to detect with a very fast scanning method a suspicious region inside a bag. In case of a two-dimensional scanner or a CT scanner is used in the third scanner stage 18, an identification of a suspicious region or region of interest (ROI) can be done by measuring the attenuation coefficient of the materials in the item of baggage 4 scanned at the third scanner stage and by comparing these attenuation coefficients to tables linking the attenuation coefficients to materials. In case no suspicious region is identified in the third scanner stage 18, the item of baggage 4 can be transported through the scanner system 2 without performing any further scan or can be branched off from the conveyer belt 20 and transported directly to a destination.

In case a region of interest (ROI) is identified during the scan at the third scanner stage 18, position information on the region of interest within the item of baggage 4 is transmitted to the calculation unit 10. Also, orientation information relating to an orientation of the object 4 during the scan at the third scanner stage 18 is transmitted from the third scanner stage 18 to the calculation unit 10.

The calculation unit 10 has an interface 22 for receiving the position information on the region of interest within the object 4 and for receiving the orientation information with respect to the orientation of the object 4 during the scan at the third scanner stage 18.

When a ROI was identified at the third scanner stage 18, the item of baggage 4 is transported to the scanner system 2 and scanned by means of the first scanner stage 6. On the basis of the scanning result at the first scanner stage 6, the calculation unit 10 determines the orientation of the item of baggage 4 in the scanner system 2. On the basis of the orientation of the item of baggage 4 at the scanner stage 2, and on the basis of the orientation information on the orientation of the item of baggage 4 during the scan at the third scanner stage 18, the calculation unit 10 determines a difference between the first orientation and the second orientation. On the basis of this difference and the position information with respect to the position of the ROI in the item of baggage 4, the calculation unit determines an area to be scanned at the second scanner stage 8, such that the area includes the ROI. The calculation unit 10 controls the second scanner stage 8 such that only the determined area or adjacent areas thereof is scanned.

Figure 2:
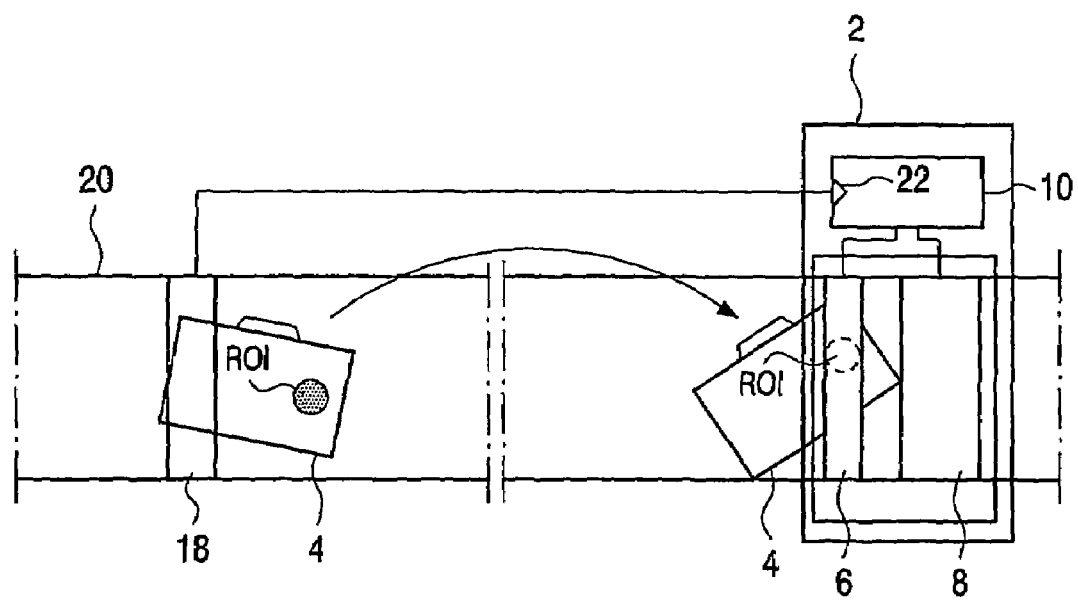
FIG. 2 shows a top view of a scanner system according to the present invention.

FIG. 2 shows a top view of the scanner system of FIG. 1. In FIG. 2, the same reference characters are used for designating the same or corresponding means of apparatus. As can be seen in FIG. 2, the item of baggage 4 scanned at the third scanner stage 18 may be moved or displaced during its travel from the third scanner stage 18 to the first scanner stage 6 of the scanner system 2. Thus, at the location of the third scanner stage 18, the item of baggage 4 may have a different orientation than it does at the location of the scanner system 2. With the orientation of the item of baggage 4, the position of the ROI within the item of baggage 4 changes too. The difference in orientation at the third scanner stage 13 and at the scanner system 2 includes a rotation of the item of baggage 4 on the conveyer belt 20, a displacement of the item of baggage 4 and a reversing of the item of baggage 4. Thus, the difference may include movements in all three dimensions.

Figure 3A:
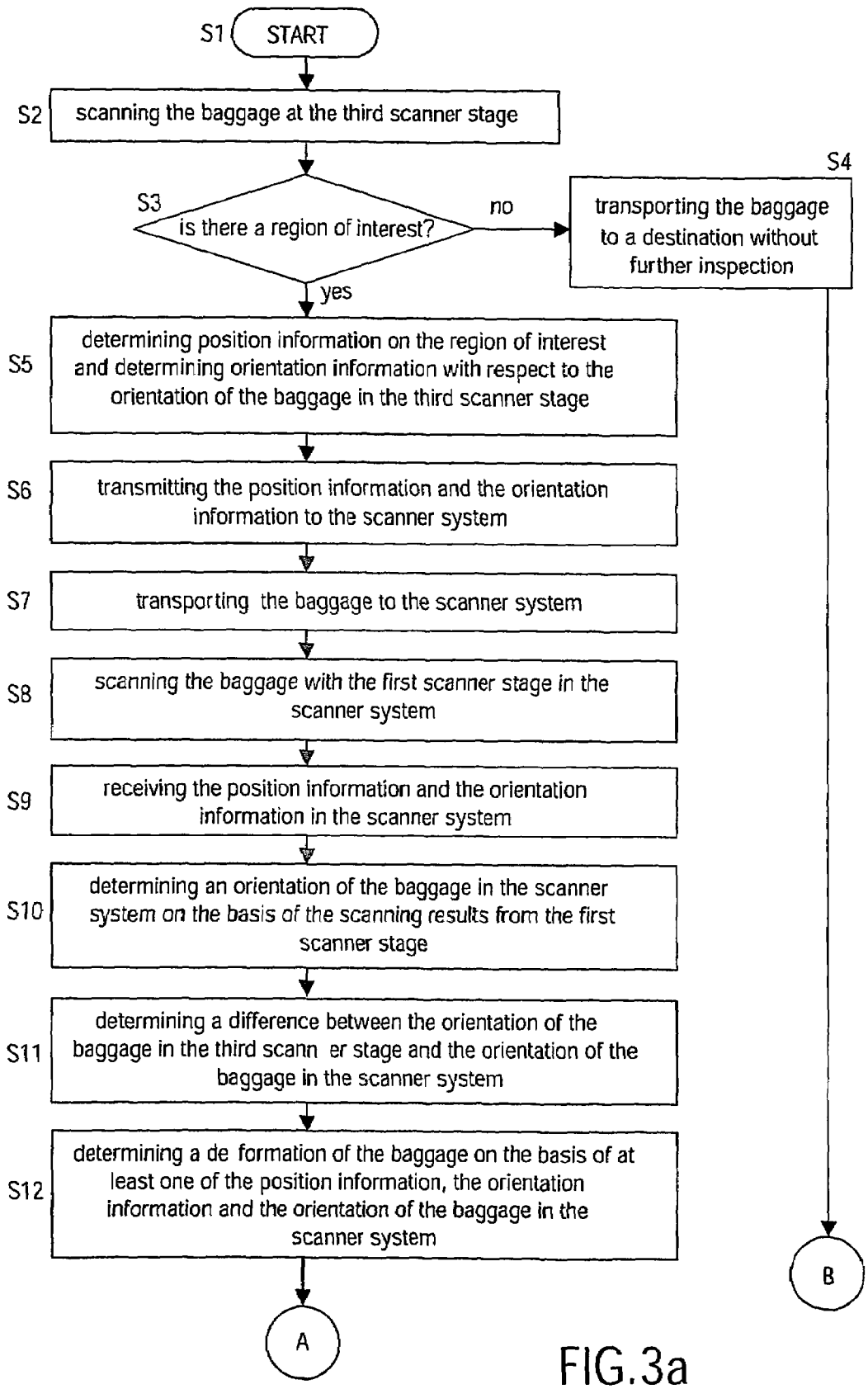
FIGS. 3a and 3b are a flowchart of an exemplary embodiment of a method of operating the scanner system of FIG. 1.
Figure 3B:
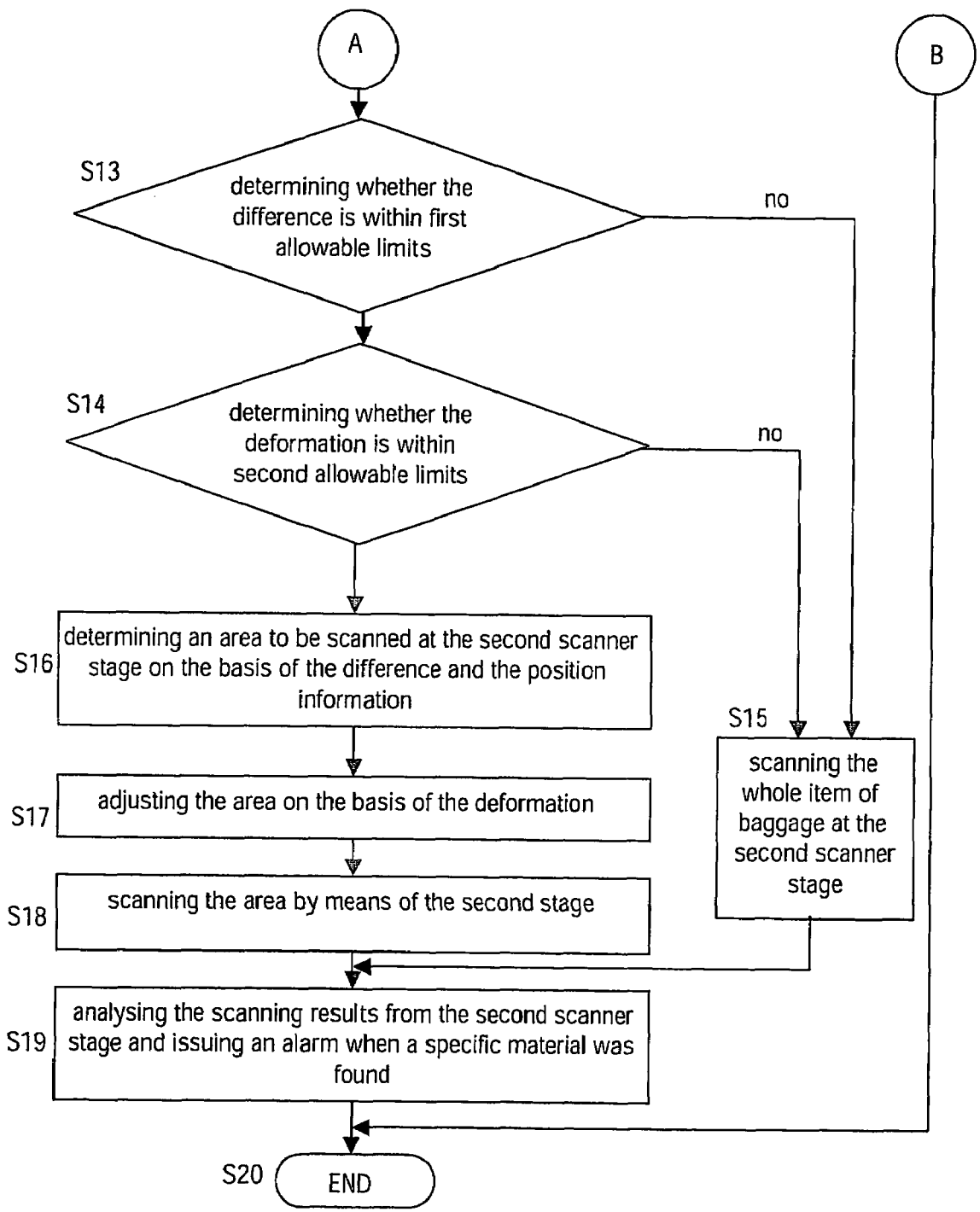

FIGS. 3a and 3b are a flowchart of an exemplary embodiment of a method of operating the scanner system of FIG. 1. After the start in step S1, the item of baggage 4 is transported on the conveyer belt 20 to the first scanner stage 18 where the item of baggage 4 is scanned in step S2. Then, the method continues to step S3, where a query is made whether there is a ROI within the item of baggage 4. In case it is determined in step S3 that there is no region of interest (ROI) in the item of baggage 4, i.e. that is there is no "suspicious" material or item in the item of baggage 4, the method continues to step S4, where the item of baggage 4 is transported to its destination without further inspection. To do this, the item of baggage 4 may either pass the scanner system 2 without being scanned or may be by-passed by the scanner system 2. Then, as indicated by the encircled B at the bottom of FIG. 3a and the encircled B at the top of FIG. 3b, the method continues to step S20 where it ends.

If it was determined in step S3 that there is a ROI, the method continues to step S5 where position information on the region of interest and orientation information with respect to the orientation of the baggage at the third scanner stage 18 is determined. Depending on which type of X-ray scanner is used, the position information and the orientation information may contain information with respect to the position of the ROI and the orientation of the item of baggage 4 within a two-dimensional space or a three-dimensional space.

In the subsequent step S6, the position information and the orientation information is transmitted from the third scanner stage 18 to the interface 22 of the calculation unit 10 of the scanner system 2. Then the method continues to step S7.

In step S7, the item of baggage 4 is transported by means of the conveyer belt 20 from the third scanner stage 18 to the scanner system 2. As explained with reference to FIG. 2, during this transport, the item of baggage 4 may be moved or reversed on the conveyer belt 20. Then, the method continues to step S8 where the item of baggage 4 is scanned with the first scanner stage 6 in the scanner system 2. As already described with reference to FIG. 1, preferably the first scanner stage 6 is a simple X-ray transmission scanner consisting of an X-ray source 12 and a line detector 16 for detecting a two-dimensional image of the item of baggage 4 while it is advanced through the first scanner stage 6.

Instead of an X-ray scanner, it is also possible to use for example an optical scanner such as a digital camera at the first scanner stage 6, in order to determine the orientation of the item of baggage 4 in the scanner system 2.

In the subsequent step S9, the calculation unit 10 receives the position information and the orientation information from the third scanner stage 18. Then, the method continues to step S10, where the calculation unit 10 determines an orientation of the item of baggage 4 in the scanner system 2 on the basis of the scanning results from the first scanner stage 6. In other words, the calculation unit 10 determines the orientation of the item of baggage 4 on the conveyer belt 20 from the image determined at the first scanner stage 6.

Then, the method continues to step S11, where the calculation unit 10 determines a difference between the orientation of the item of baggage 4 at the third scanner stage 18 and the orientation of the baggage in the scanner system 2.

In case a CT scanner is used as the third scanner stage 18, the position information and the orientation information transmitted by the third scanner stage 18 to the calculation unit 10 may consist of a three-dimensional data set consisting of the attenuation coefficients of the item of baggage 4. From this, the calculation unit 10 may determine projection data having arbitrary perspectives. Then, by means of the calculation unit 10, the perspectives are adjusted such that the prospective of the projection determined from the three-dimensional data set from the third scanner stage 18 corresponds to the perspective of the image from the first scanner stage 6. This is referred to as a 3D-2D registration. While doing this, it has to be ensured that this registration is definite and non-ambiguous. Then, on the basis of the 3D-2D registration, the calculation unit 10 determines a transformation matrix describing the displacement, i.e. the difference in orientation between the orientation at the third scanner stage 18 and the orientation at the first scanner stage 6.

In case a scanner determining a two-dimensional image of the item of baggage 4, such as for example an X-ray transmission scanner is used as the third scanner stage 18, the position information and the orientation information transmitted from the third scanner stage 18 to the calculation unit 10 consists of two-dimensional information. In this case, a 2D-2D registration is carried out at the calculation unit 10. While being very fast and efficient, by using the 2D-2D registration, only a rotation of the item of baggage 4 around a single axis and a displacement of the item of baggage 4 on the conveyer belt may be determined.

In step S12, a deformation of the item of baggage 4 is determined on the basis of at least one of the position information, the orientation information and the orientation of the baggage in the scanner system 2. This for example may be done by subtracting the two-dimensional image form the third scanner stage 18 which perspective has been adapted to the perspective of the two-dimensional image from the first scanner stage 6. Also, this may be done by a segmentation of the item of baggage 4 from the scanning results of the third scanner stage 18, and a comparison thereof to a segmentation of the item of baggage 4 from the image of item of baggage 4 determined at the first scanner stage 6.

Then, as indicated my means of the encircled A at the bottom of FIG. 3*a* and the encircled A at the top of FIG. 3*b*, the method continues to step S13 where a query is made whether the difference is within predetermined allowable limits. In case it is determined in step S13 that the differences are outside predetermined allowable limits or that there is a difference which cannot be described with the transformation matrix, the method continues to step S14.

In case it was determined in step S13 that the difference is within the allowable limit, the method continues to S14 where it is determined whether the deformation is within a predetermined allowable limit. In case it is determined in step S14 that the deformation exceeds the allowable limits for the deformation, i.e. the item of baggage 4 was deformed more than allowed, the method continues to step SI 5.

In step S15, the whole item of baggage 4 is rescanned by means of the second scanner stage 18 of the scanner system 2. Then, the method continues to step S19.

In case it was determined in step S14 that the deformation is within the allowable limits for the deformation, the method continues to step S16, where the calculation unit 10 determines an area to be scanned at the second scanner stage 8 of the scanner system 2, on the basis of the difference and the position information. Also, the information on the deformation may be used to determine the area to be scanned at the second scanner stage 8.

In case the ROI determined at the third scanner stage 18 can be determined very exactly, and no deformation of the item of baggage 4 was determined, the area to be scanned can be limited to the ROI determined at the third scanner stage 18.

In case, in particular when the 2D-2D registration was used, no sufficiently complete transformation matrix could be found to describe the displacement of the item of baggage 4 on the conveyer belt 20, the area to be scanned is enlarged such that it can be ensured that the ROI is included in the area to be rescanned.

Furthermore, depending on the deformation of the item of baggage 4, the area to be rescanned is adjusted. In case of large deformations, the item in the baggage consisting of or including the suspicious material, may have moved within the item of baggage 4, such that the area is enlarged. In case a complete transformation matrix was determined in step S11 and no deformation was detected, the position of the ROI in the scanner system 2 can easily be determined by transforming the position information received from the third scanner stage 18 to the new position by means of the transformation matrix.

After the determination of the area to be scanned at the second scanner stage 8, and the adjustment of the area on the basis of the deformation in steps in S16 and S17, the method continues to step S18 where the area determined in steps S16 and S17 is scanned by means of the second scanner stage 8 in the scanner system 2. Then, the method continues to step S19 where the scanning results from the second scanner stage 8 are analyzed and an alarm is issued when a specific material was found. Then, the method continues to step S20 where it ends.

The steps S8 to S14 and S16 to S19 are preferably carried out by means of the calculation unit 10.

As already indicated above, the above method and apparatus may advantageously be used in the field of airport baggage inspection, where a multi-level screening procedure is used. Advantageously, the present invention provides for a very fast and efficient method and apparatus, allowing for a very precise determination of specific materials within items of baggage while only necessitating the provision of an additional X-ray transmission scanner in the second level scanner. This first scanner stage 6 in the scanner system 2 does not require a high location or contrast resolution. Also, noise can be tolerated. Accordingly, an X-ray source 12 may be used which has a relatively small power.

Advantageously, according to the present invention, the time required to inspect an item of baggage such as a suitcase can be reduced significantly. For example, the time to inspect a suitcase having a length of one meter and having a ROI of 20 cm can be reduced to one fifth of the time which is required in known scanner systems.

As already mentioned above, apart from being applied in a baggage inspection system, the present invention may also be applied to medical applications or to material inspection for, e.g., pipelines.

The invention claimed is:

1. A scanner system for scanning an object, the scanner system comprising: a first scanner stage; a second scanner stage at a location; a calculation unit connected to the first scanner stage and to the second scanner stage and receives first scanning results from the first scanner stage; wherein the calculation unit has an interface for receiving position information on a region of interest within the object and for receiving orientation information with respect to a first orientation of the object, wherein the position information and the orientation information was determined by means of a third scanner stage which is located at a distance from the scanner system and which scanned the object having the first orientation; wherein the calculation unit is adapted to determine a second orientation of the object at the second location on the basis of the first scanning results from the first scanner stage; wherein the calculation unit is adapted to determine a difference between the first orientation and the second orientation by using the orientation information; wherein the calculation unit is adapted to determine an area to be scanned at the second scanner stage on the basis of the difference and the position information, the area including the region of interest.

2. The scanner system according to claim 1, wherein the calculation unit is further adapted to: determine a deformation of the object on the basis of at least one of the position information, the orientation information and the second orientation; determine whether the difference is within first allowable limits and whether the deformation is within second allowable limits; scanning the whole object with the third scanning device when at least one of the difference and the deformation is outside the first or second allowable limits.

3. The scanner system according to claim 1, wherein the first scanner stage is a x-ray transmission scanner; wherein the second scanner stage is a coherent-scatter computed tomographic (CSCT) scanner; and wherein the third scanning stage is one of a two-dimensional X-ray scanner and a computed tomographic (CT) scanner.

4. The scanner system of claim 1, wherein the scanner system is an inspection system detecting specific materials of interest in items of baggage or packages wherein the items of baggage or packages are transported from the third scanner stage to the first scanner stage by means of a conveyer belt.

5. Method of examining an object by means of a first scanner stage and a second scanner stage at a location, the method comprising the steps of: receiving first scanning results from the first scanner stage; receiving position information on a region of interest within the object and receiving orientation information with respect to a first orientation of the object, wherein the position information and the orientation information was determined by means of a third scanner stage which is located at a distance from the first and second scanner stages and which scanned the object having the first orientation; determining a second orientation of the object at the location on the basis of the first scanning results from the first scanner stage; determining a difference between the first orientation and the second orientation by using the orientation information; determining an area to be scanned at the second scanner stage on the basis of the difference and the position information, the area including the region of interest.

6. The method of claim 5, further comprising the steps of: determining a deformation of the object on the basis of at least one of the position information, the orientation information and the second orientation; determining whether the difference is within first allowable limits and whether the deformation is within second allowable limits; scanning the whole object with the third scanning device when at least one of the difference and the deformation is outside the first or second allowable limits.

7. The method of claim 5, wherein the method is an inspection method for detecting a specific material of interest in items of baggage or packages and wherein the items of baggage or packages are transported from the third scanner stage to the first scanner stage by means of a conveyer belt.

8. Method of examining an object, the method comprising the steps of: scanning the object at a first location with a first scanning device to determine a first orientation of the object at the first location and a first position of a region of interest in the object at the first location; scanning the object at a second location with a second scanning device to determine a second orientation of the object at the second location; determining a difference between the first orientation and the second orientation; determining a second position of the region of interest in the object at the second location on the basis of the difference between the first orientation and the second orientation; defining an area of the object to be further scanned on the basis of the second position of the region of interest in the object at the second location, the area including the region of interest; and scanning the area of the object with a third scanning device.

9. A computer readable storage medium encoded with a computer program for use in a scanner system for examining an object by means of a first scanner stage and a second scanner stage at a location, the computer program comprising computer readable code for performing the following steps when executed on a computer of the scanner system: receiving first scanning results from the first scanner stage; receiving position information on a region of interest within the object and receiving orientation information with respect to a first orientation of the object, wherein the position information and the orientation information was determined by means of a third scanner stage which is located at a distance from the first and second scanner stages and which scanned the object having the first orientation; determining a second orientation of the object at the location on the basis of the first scanning results from the first scanner stage; determining a difference between the first orientation and the second orientation by using the orientation information; determining an area to be scanned at the second scanner stage on the basis of the difference and the position information the area including the region of interest.

* * * * *